United States Patent
Furuta et al.

(10) Patent No.: US 6,523,658 B2
(45) Date of Patent: Feb. 25, 2003

(54) CLUTCH MECHANISM FOR USE IN ROTARY TOOLS HAVING SCREW-DRIVING AND DRILL MODES

(75) Inventors: Takefumi Furuta, Anjo (JP); Takao Kuroyanagi, Okazaki (JP)

(73) Assignee: Makita Corporation, Aichi-Ken (JP)

( * ) Notice: Subject to any disclaimer, the term of this patent is extended or adjusted under 35 U.S.C. 154(b) by 0 days.

(21) Appl. No.: 09/792,725

(22) Filed: Feb. 23, 2001

(65) Prior Publication Data

US 2001/0035326 A1 Nov. 1, 2001

(30) Foreign Application Priority Data

Mar. 3, 2000 (JP) ........................ 2000-059458

(51) Int. Cl.[7] ................ B25B 23/157; F16D 43/20
(52) U.S. Cl. ................ 192/56.61; 192/69.91; 173/178
(58) Field of Search ............ 192/56.56, 56.61, 192/69.61, 108; 464/39; 475/263; 173/178; 81/474, 475

(56) References Cited

U.S. PATENT DOCUMENTS

| | | | | |
|---|---|---|---|---|
| 1,879,486 A | * | 9/1932 | Rancke | 192/56.56 |
| 2,408,501 A | * | 10/1946 | Wright | 192/56.56 X |
| 2,546,633 A | * | 3/1951 | Dodge | 192/56.56 X |
| 3,282,387 A | * | 11/1966 | Becker | 192/56.56 X |
| 4,834,192 A | * | 5/1989 | Hansson | 173/178 |
| 4,842,078 A | | 6/1989 | Hansson | 173/12 |
| 4,869,131 A | | 9/1989 | Ohmari | 74/750 |
| 5,005,682 A | * | 4/1991 | Young et al. | 173/178 X |
| 5,277,527 A | | 1/1994 | Yokota et al. | 408/139 |
| 5,449,043 A | | 9/1995 | Bourner et al. | 173/178 |
| 5,568,849 A | * | 10/1996 | Sasaki et al. | 195/56.56 X |

FOREIGN PATENT DOCUMENTS

| | | |
|---|---|---|
| DE | 2148739 | 11/1972 |
| DE | 3920471 C1 | * 9/1990 |
| DE | 19705378 A1 | 8/1997 |
| JP | 3-74633 A | * 3/1991 |

OTHER PUBLICATIONS

JP 6–39740 (Masami et al.) Patent Abstracts of Japan, Feb. 15, 1994 (abstract).
JP 7–75976 (Masami et al.) Patent Abstracts of Japan, Mar. 20, 1995 (abstract).
JP 7–293583 (Hideki) Patent Abstracts of Japan, Nov. 7, 1995 (abstract).
JP 9–79292 (Hideki) Patent Abstracts of Japan, Mar. 25, 1997 (abstract).

* cited by examiner

*Primary Examiner*—Richard M. Lorence
(74) *Attorney, Agent, or Firm*—Lahive & Cockfield, LLP

(57) ABSTRACT

A clutch mechanism (17) includes an internal gear (10) and a plurality of cylindrical pins (26) pressed rearward against a front end surface of the internal gear (10) by a coil spring (25) via a flat washer (24). Provided on the internal gear's front end surface are a plurality of cam protrusions (28) corresponding in number and position with the pins (26). Each cylindrical pin (26) has at its rear end surface a circumferentially chamfered edge (27) and each cam protrusion (28) has a pair of guide slope surfaces (29) with same inclination as the chamfered edge (27) of the pin (26).

13 Claims, 3 Drawing Sheets

CLUTCH MECHANISM FOR USE IN ROTARY TOOLS HAVING SCREW-DRIVING AND DRILL MODES

This application claims priority on Japanese Patent Application No. 2000-59458 filed on Mar. 3, 2000, the contents of which are incorporated herein by reference.

BACKGROUND OF THE INVENTION

1. Field of the Invention

The present invention relates to clutch mechanisms. More particularly, the present invention relates to a clutch mechanism for use in a dual-mode rotary tool having a screw-driving mode and a drill mode that can control the upper limit of the output torque of an epicyclic reduction gear mechanism by adjusting the force that holds an internal gear of the epicyclic reduction gear mechanism.

2. Description of the Related Art

Figure 3A:
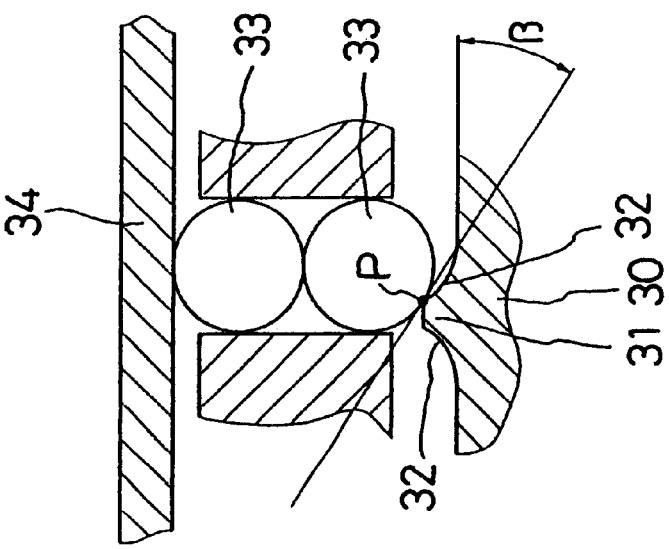
Figure 3B:
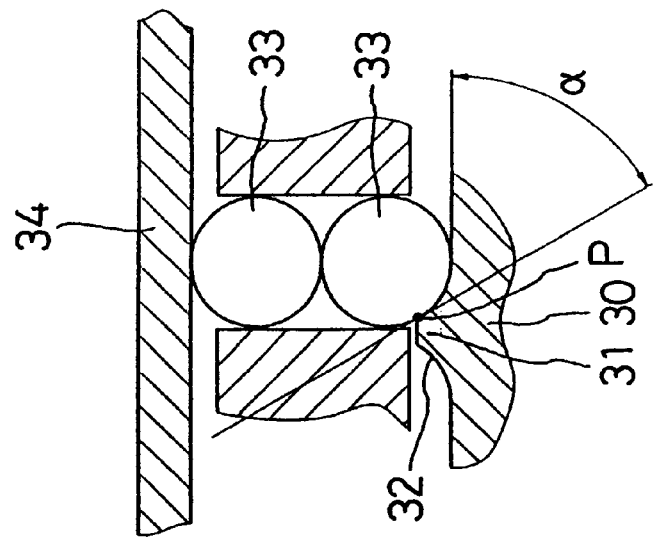

A typical dual-mode rotary tool having a screw-driving mode and a drill mode (referred to as a screwdriver/drill hereinafter) is provided with a clutch mechanism which can control the upper limit of the output torque of the tool. FIG. 3A shows one example of such a clutch mechanisms having a rotatable internal ring gear 30 as part of an epicyclic reduction gear mechanism that transmits torque from a motor to a spindle. The internal ring gear 30 has on an end surface thereof a plurality of axial cam protrusions 31 with each protrusion including a pair of circumferentially inclined guide slope surfaces 32. As shown in FIG. 3B, the clutch mechanism further includes press means, such as balls 33, pressed against the notched end surface of the internal ring gear 30 via a flat washer 34 by a biasing means such as a coil spring (not shown). In this way, the press means prevents the internal gear 30 from rotation by holding the balls 33 against the cam protrusions 31.

In accordance with this clutch mechanism, if a load exceeding the biasing force of the coil spring is applied to the internal gear 30, the balls 33 ride up the guide slope surfaces 32 over the cam protrusions 31, allowing idle rotation of the internal gear 30 and thus interrupting the transmission of the motor torque to the spindle of the rotary tool.

Figure 3C:
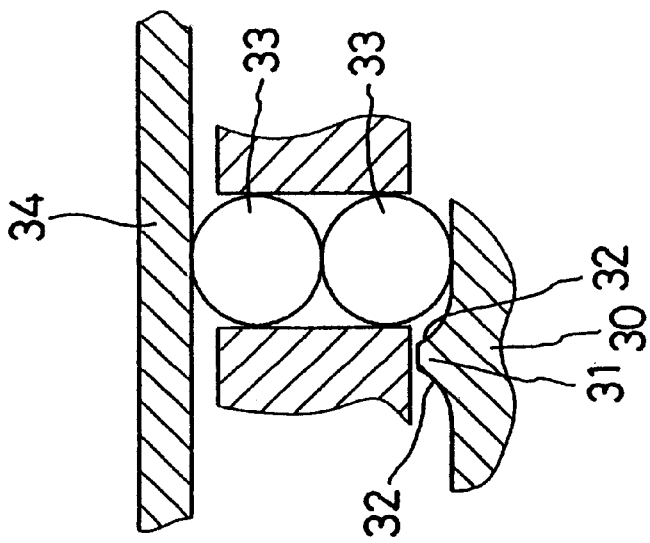

In addition to the clutch mode, the above-described clutch mechanism also provides a drill mode in which the clutch remains engaged and is prevented from slipping. More particularly, in this mode, a lock member or a stopper is directly pressed against and locks up the flat washer 34 so as not to allow rotation of the internal gear 30, thus maintaining the rotation of the spindle regardless of the load applied to the spindle. As shown in FIG. 3C, when a load is applied to the too in this mode, the clearance between components may cause the balls 33 to be lifted off the guide slope surfaces 32 without riding over the cam protrusions 31.

While the foregoing clutch mechanism achieves its intended objective, it suffers from a number of deficiencies that reduce its utility. For example, in this arrangement, P, the point of contact of the lower ball 33 with the guide slope surface 32, remains at the top corner of the cam protrusion 31, regardless of whether the rotary tool is in the operating condition shown in or in FIG. 3C. This means when the balls 33 are lifted, the apparent angle of the cam decreases (angle α (FIG. 3B)>angle β (FIG. 3C)), thus increasing the force acting in the axial direction on the balls 33 or the force that pushes up the ball 33 and the flat washer 34. This in turn increases the possibility of the ball 33 accidentally riding over the cam protrusion a 31, thereby disengaging the clutch. It should be noted that the same may occur if the balls are replaced with pins having a spherical bottom end. In addition, the increased force acting in the axial direction tends to cause more wear and/or damage to tool components, such as the flat washer or any other type of a stopper subjected to or bearing the axial force.

SUMMARY OF THE INVENTION

In view of the above-identified problems, an important object of the present invention is to provide a clutch mechanism for use in a dual-mode rotary tool having screw-driving and drill modes that is capable of reliably preventing unintended disengagement of the clutch in the drill mode so as to minimize wear or damage to components of the tool.

The above object and other related objects are realized by the invention, which provides a clutch mechanism for use in a rotary tool having screw-driving and drill modes. The clutch mechanism comprises: an epicyclic reduction gear mechanism including an internal gear rotatably held within a housing; a plurality of axial cam protrusions provided on an axial end surface of the internal gear, with each cam protrusion having at least one guide slope surface; a plurality of axially movable press members; biasing means for pressing the press members against the axial end, surface of the internal gear so as to secure the cam protrusions by causing the press members to interfere with the guide slope surfaces of the cam protrusions; and means for selectively regulating the axial movement of the press members away from the axial end surface. In this clutch mechanism, each press member comprises an axial body which is disposed orthogonally to the axial end surface of the internal gear and which includes at least one slope surface, with the slope surface being slidable on the guide slope surfaces due to revolution of the cam protrusions so as to move the axial body away from the axial end surface of the internal gear. According to this mechanism, although the axial bodies (i.e., the press members) may be lifted along the cam protrusions in the drill mode, they do not ride over the cam protrusions, thus preventing unintended clutch disengagement or slippage. Moreover, as the axial force acting on the axial bodies remains relatively small, the impact on tool elements such as the regulating means does not become excessive, thus protecting these elements from excessive wear and damage.

According to one aspect of the present invention, the slope surface of each axial body has the same inclination as the at least one guide slope surface of each cam protrusion. This arrangement stabilizes the operation of the axial bodies in conjunction with the cam protrusions, enhancing the performance the clutch mechanism regardless of whether the rotary tool is in the drill mode or the screwdriver mode.

According to another aspect of the present invention, each axial body is adapted to slide along the guide slope surfaces in parallel to itself relative to the internal gear.

According to still another aspect of the present invention, the axial bodies are arranged in a circumference and the cam protrusions are also arranged in a circumference so as to correspond in number and position with the axial bodies.

According to yet another aspect of the present invention, each axial body has first and second axial ends, with the first end opposing the means for biasing and the second end abutting the axial end surface of the internal gear. Additionally, the slope surface of each axial body is a circumferentially chamfered edge provided on the second end thereof.

According to one feature of the present invention, each cam protrusion includes two circumferential guide slope surfaces symmetrical about an axis of the protrusion such that the axial bodies are movable away from the cam protrusions parallel to themselves while maintaining surface-to-surface contact between the guide slope surfaces and the chamfered edges.

According to another feature of the present invention, the means for biasing is a coil spring fitted between the means for regulating and the axial bodies. The means for regulating is a sleeve member adapted to be screw-fed through an external operation to change its axial position, and thus the biasing force, of the coil spring acting on the internal gear via the axial bodies.

According to still another feature of the present invention, the clutch mechanism may further comprise a washer disposed between one end of the coil spring and the axial bodies, and the sleeve member has an end distal to the axial bodies and the washer and an end proximal to the axial bodies and the washer. The distal end forms a radially extending flange thereat for abutting another end of the coil spring, and the proximal end can be brought into abutment against the washer through an external operation of the sleeve member so as to securely hold the cam protrusions against revolution via the axial bodies, regardless of a load imposed on the rotary tool.

According to yet another feature of the present invention, each axial body and each cam protrusion have an apparent cam angle and are adapted to maintain the apparent cam angle regardless of the operating condition of the rotary tool.

According to one practice of the present invention, each axial body is a cylindrical pin slidably held through a gear case of the rotary tool.

Other general and more specific objects of the invention will in part be obvious and will in part be evident from the drawings and descriptions which follow.

BRIEF DESCRIPTION OF THE ATTACHED DRAWINGS

Figure 1:
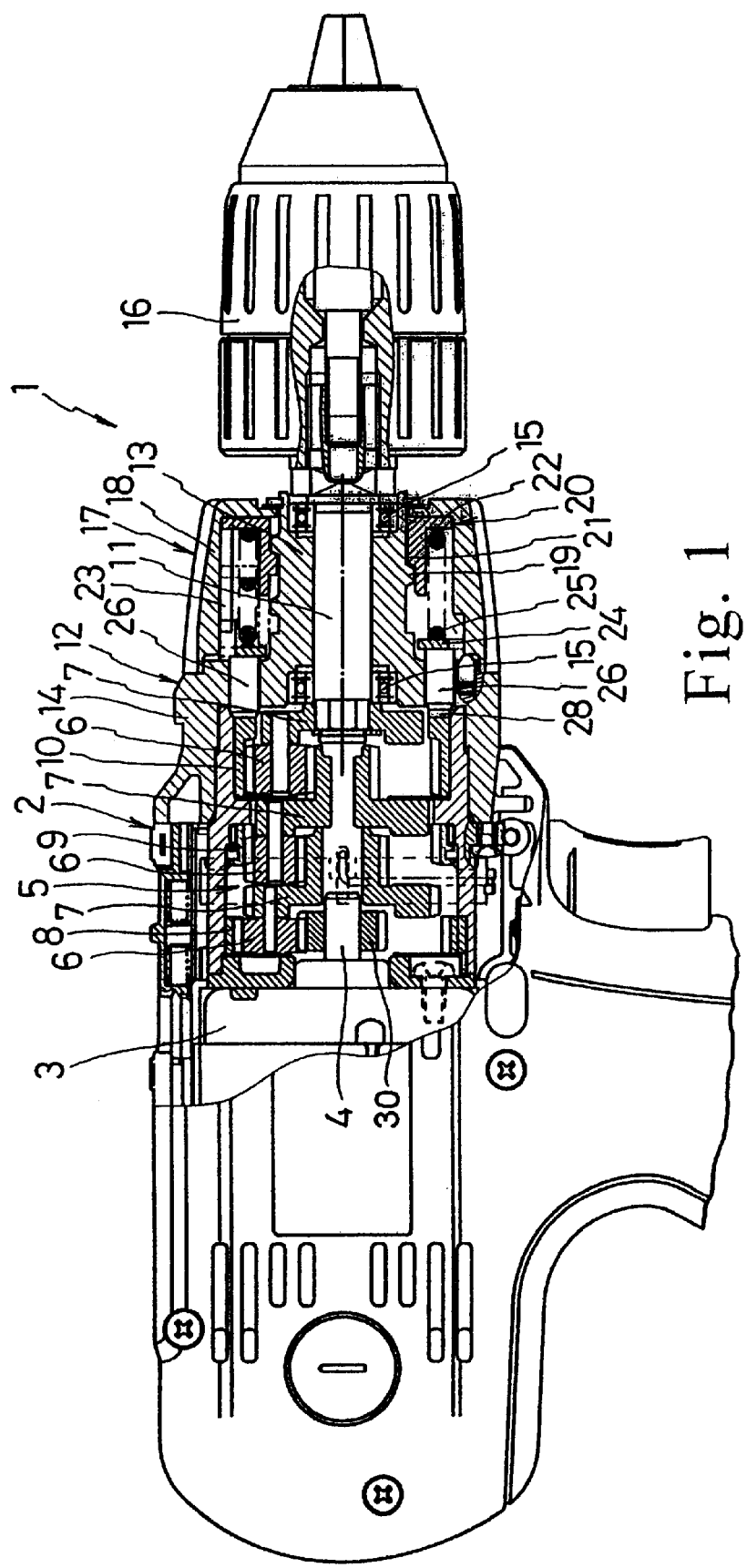
Figure 2A:
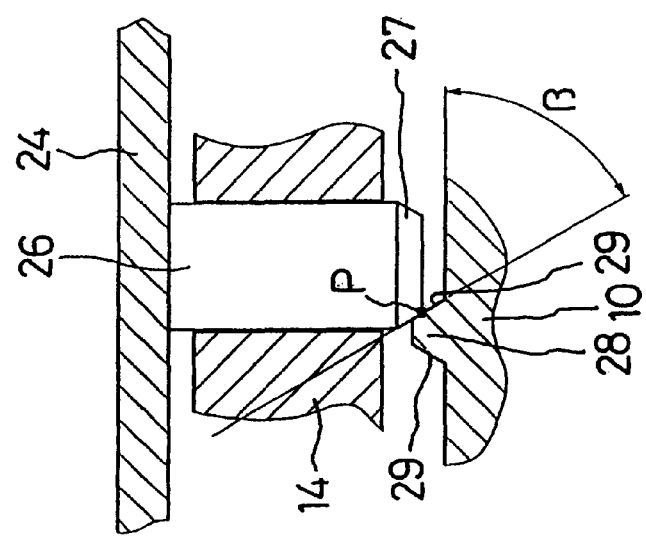
Figure 2B:
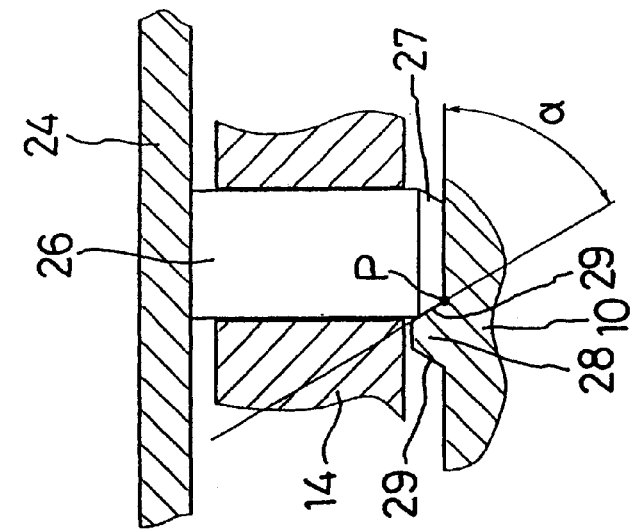
Figure 2C:
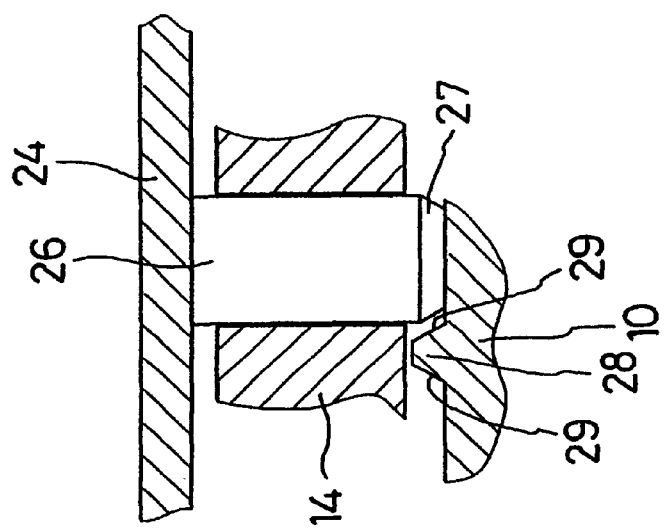

For a fuller understanding of the nature and objects of present invention, reference should be made to the following detailed description and the accompanying drawings, in which:

FIG. 1 is a partly cross-sectional side elevation of an essential part of a dual-mode rotary tool such as a screwdriver/drill 1 in accordance with the present invention, shown with part of its casing removed to expose internal mechanisms;

FIGS. 2A–C show different operating conditions of the clutch mechanism of the screwdriver/drill shown in FIG. 1; and FIGS. 3A–C show different operating conditions of a conventional clutch mechanism for use in a rotary tool.

DETAILED DESCRIPTION OF THE PREFERRED EMBODIMENT

A preferred embodiment according to the present invention will be described hereinafter with reference to the attached drawings.

FIG. 1 is a partly cross-sectional side elevation of an essential part of a dual-mode rotary tool such as a screwdriver/drill 1 in accordance with the present invention, shown with part of its casing removed to expose internal mechanisms. The screwdriver/drill 1 includes a motor 3 at its rear end encased within a main housing 2 (the left in the drawing is referred to as the rear hereinafter). The motor 3 includes an output shaft 4 for transmission of its rotation to a tool bit (not shown) attached to the top end of the rotary tool 1. The screwdriver/drill 1 additionally includes a battery pack at the bottom of a grip handle (neither shown) so as to supply power source to the motor 3 to operate the rotary tool 1. Provided forward of the motor 3 is a conventional epicyclic reduction gear mechanism 5 which includes three stages of planet gears 6, three stages of carriers 7 for rotatably supporting the planet gears 6, and three stages of internal gears 8, 9, and 10 meshing with the planet gears 6 of the respective stages. When operated, the epicyclic reduction gear mechanism 5 reduces the rotational speed of the output shaft 4 of the motor 3 through the three stages of the mechanism before transmitting the speed-reduced rotation to a spindle 11 connected to the third stage carrier 7. The dual mode rotary tool 1 further includes a pinion 30 which is secured on the output shaft 4 of the motor 3 and engages the first stage planet gears 6.

Additionally included in the electric screwdriver/drill 1 is a gear case 12 provided forward of the main housing 2. The gear case 12 includes a large-diameter section 14 and a reduced-diameter section 13 protruding forward from the front end of the large-diameter section 14. The spindle 11 is inserted into the reduced-diameter section 13 and supported by two ball bearings 15 disposed at both axial ends of the reduced-diameter section 13. A drill chuck 16 is attached to the top end of the spindle 11 forward of the reduced-diameter section 13.

Moreover, a clutch mechanism 17 for torque limitation is provided on the gear case 12. The clutch mechanism 17 includes a change ring 18 rotatably provided around the reduced-diameter section 13 so as to adjust the torque at which the clutch starts to slip. The reduced-diameter section 13 has external threads 19. A regulating means such as a stopper 20 provided with internal threads 21 is fitted around the reduced-diameter section 13 such that the internal threads 21 mesh with the external threads 19 of the reduced-diameter section 13. The stopper 20 includes at its front end a flange 22 which is securely fitted in an axial groove 23 formed in the inner surface of the change ring 18. Accordingly, when the change ring 18 is rotated, the stopper 20 integrally rotates therewith so as to be screw-fed along the longitudinal axis of the reduced-diameter section 13 of the gear case 12.

The clutch mechanism 17 further includes a flat washer 24 fitted around the base of the reduced-diameter section 13. The flat washer 24 is biased toward the large-diameter section 14 by a coil spring 25 disposed between the flat washer 24 and the flange 22 of the stopper 20. A plurality of axial bodies, such as cylindrical pins 26, are slidably inserted into the shoulder of the large-diameter section 14. Furthermore the pins 26 are positioned circumferentially along the shoulder of the section 14 at the same intervals so as to be located directly behind the flat washer 24. Thus, the pins 26 are biased rearward by the coil spring 25 via the flat washer 26 with the rear ends of the pins pressed orthogonally against the front end of the third stage internal gear 10.

As shown in FIG. 2A, the internal gear 10 includes on its front end surface a plurality of cam protrusions 28 which are circumferentially positioned and project in the axial direction. Each protrusion includes a pair of circumferentially inclined guide slope surfaces 29 as illustrated. These cam protrusions 28 correspond in number and position with the cylindrical pins 26. Each pin 26 includes at its rear end (at the bottom end as shown in FIGS. 2A–2C) circumferentially chamfered edge 27 tapering at the same angle as the inclined guide surface of the cam protrusion 28 when the rotary tool 1 is assembled.

In the operation of the screwdriver/drill 1 thus constructed, when the change ring 18 is rotated by the user to screw-feed the stopper 20 to any position where the stopper is not in contact with the flat washer 24, the rotary tool 1 is placed in a clutch or screw-driving mode in which the internal gear 10 is secured against rotation by the biasing force of the coil spring 25 alone. Upon activation of the motor 3, the planet gears 6 of the reduction gear mechanism 5 starts to revolve, thus applying force in the direction opposite to that of the revolution of the planets. As shown in FIG. 2B, abutment of the cam protrusions 28 against the pins 26 prevents rotation of the internal gear 10, thereby allowing transmission of the motor torque to the spindle 11. Subsequently, the transmitted torque turns a tool bit such as a screwdriver bit held in the drill chuck 16 so as to perform tightening of a screw.

As shown in FIG. 2C, when the load on the spindle 11 increases, for example, toward the completion of tightening of a screw, whereby the force acting to rotate the internal gear 10 exceeds the spring's biasing force bearing against the gear 10, the chamfered edge 27 of each pin 26 slides up on the guide slope surface 29 of the cam protrusion 28. Accordingly, the pins 26 and the flat washer 24 are thrust forward and onto the top surface of the cam protrusions 28 as shown in FIG. 1 below the axial dot-and-dash line drawn through the spindle 11. As this permits idle rotation of the internal gear 10, the transmission of torque to the spindle 11 is interrupted. The cylindrical pins 26 continuously ride over the cam protrusions 28 as far as the load on the spindle 11 remains in excess of the pressing force of the coil spring 25.

Alternatively, when the change ring 18 is rotated to bring the rear end surface of the stopper 20 into abutment with the flat washer 24 (the operating condition shove in FIG. 1 above the axial dot-and-dash line), the rotary tool 1 is placed in a drill mode in which the washer 24 and thus the pins 26 are prevented from moving forward by the stopper 20. Thus, the internal gear 10 is securely held, such that the torque transmission remains uninterrupted even if a large load is imposed on the spindle 11.

As shown in FIG. 2C, when a load is applied in this mode, the clearance between internal components causes the pins 26 to slide relative to the cam protrusions 28 along the interface between the chamfered edges 27 of the pins and the guide slope surfaces 29 of the cam protrusions. Accordingly, P, the point of contact between the tip of each pin 26 and the guide slope surfaces 29, is likewise shifted in the same manner, maintaining the apparent angle of the cam (angle α (FIG. 2B)=angle β (FIG. 2C)) after the slide motion. This means that the forces exerted on the pins 26 continue to act in the same axial and rotational directions, preventing the pins from accidentally riding over the cam protrusions and thus permitting idle rotation of the internal gear 10. Moreover, as the apparent angle remains the same, the impact on the stopper 20 and the reduced-diameter section 13 via the flat washer 24 does not become excessive as in conventional arrangements, thus protecting these elements from wear and damage.

As described above, the clutch mechanism 17 employs press members such as the cylindrical pins 26, which are disposed orthogonally to an end surface of the internal gear 10 and are provided with the chamfered edges 27. Accordingly, when the cam protrusions 28 move under the pins to disengage the clutch, the chamfered edges 27 permit movement of the pins 26 away from the internal gear's end surface by sliding relative to the cam protrusions 28 along the guide slope surfaces 29 of the protrusions. This arrangement may cause the pins 26 to be lifted off the end surface along the slope surfaces 29 of the cam protrusions 28 in the drill mode, but it effectively prevents the pins 26 from riding over the cam protrusions so as to maintain the engagement of the clutch. Moreover, as the axial force acting on the pins 26 does not increase, the stopper 20 and the reduced-diameter section 13 are not subjected to sever impact.

Since the chamfered edges 27 of the pins 26 have the same inclination or the same degree of taper as does the guide slope surfaces 29 of the cam protrusions 28, the pins 26 function in conjunction with the cam protrusions 28 in a smooth and stable manner, thus stabilizing the operation of the clutch mechanism 17 either in the screw-driving mode or in the drill mode.

In the foregoing embodiment, as far as the pins are rotation-stopped, the circumferential chamfer at the rear end of each pin 26 may be replaced with two flat chamfers disposed diametrically across the axial center of the rear end surface of the pin. It should be noted that the possibility of the pins 26 accidentally resting on the front end surface of the cam protrusions 28 after riding up the slope surfaces 29 of the protrusions in the clutch mode decreases as the area of the end of each pin 26 coming into contact with the front end surface of the internal gear is reduced.

Furthermore, the pins do not have to be cylindrical as in the foregoing embodiment; depending on the application, they may be prisms or other appropriately shaped elements. Additionally, the guide slope surfaces 29 of the cam protrusions 28 need not be inclined flat surfaces; they may be inclined curved surfaces as described in connection with the related art as long as the pins can slide along such surfaces in the manner described in the embodiment section.

EQUIVALENTS

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

Having described the invention, what is claimed as new and desired to be secured by Letters Patent is:

1. A clutch mechanism for use in a rotary tool having screw-driving and drill modes, the clutch mechanism comprising:

an epicyclic reduction gear mechanism including an internal gear rotatably held within a housing;

a plurality of axial cam protrusions provided on an axial end surface of the internal gear, each cam protrusion having at least one guide slope surface;

a plurality of axially movable press members;

biasing means for pressing the press members against the axial end surface of the internal gear so as to secure the cam protrusions by causing the press members to interfere with the guide slope surfaces of the cam protrusions; and means for selectively regulating the axial movement of the press members away from the axial end surface, wherein each press member comprises an axial body which is disposed orthogonally to the axial end surface of the internal gear and which includes at least one slope surface, the slope surface being slidable on the guide slope surfaces due to revolution of the cam protrusions so as to move the axial body away from the axial end surface of the internal gear.

2. A clutch mechanism as defined in claim 1, wherein the slope surface of each axial body has the same inclination as the at least one guide slope surface of each cam protrusion.

3. A clutch mechanism as defined in claim 1, wherein each axial body is adapted to slide along the guide slope surfaces in parallel to itself relative to the internal gear.

4. A clutch mechanism as defined in claim 1, wherein the axial bodies are arranged in a circumference and the cam protrusions are also arranged in a circumference so as to correspond in number and position with the axial bodies.

5. A clutch mechanism as defined in claim 1, wherein each axial body has first and second axial ends, the first end opposing the means for biasing and the second end abutting the axial end surface of the internal gear, and wherein the slope surface of each axial body is a circumferentially chamfered edge provided on the second end thereof.

6. A clutch mechanism as defined in claim 1, wherein each cam protrusion includes two circumferential guide slope surfaces symmetrical about an axis of the protrusion whereby the axial bodies are movable away from the cam protrusions parallel to themselves while maintaining surface-to-surface contact between the guide slope surfaces and the chamfered edges.

7. A clutch mechanism as defined in claim 1, wherein the means for biasing is a coil spring fitted between the means for regulating and the axial bodies and wherein the means for regulating is a sleeve member adapted to be screw-fed through an external operation to change its axial position, and thus the biasing force, of the coil spring acting on the internal gear via the axial bodies.

8. A clutch mechanism as defined in claim I further comprising a washer disposed between one end of the coil spring and the axial bodies, wherein the sleeve member has an end distal to the axial bodies and the washer and an end proximal to the axial bodies and the washer, the distal end forming a radially extending flange thereat for abutting another end of the coil spring and the proximal end being capable of being brought into abutment against the washer through an external operation of the sleeve member so as to securely hold the cam protrusions against revolution via the axial bodies, regardless of a load imposed on the rotary tool.

9. A clutch mechanism as defined in claim 1, wherein each axial body and each cam protrusion have an apparent cam angle and are adapted to maintain the apparent cam angle regardless of the operating condition of the rotary tool.

10. A clutch mechanism as defined in claim 1, wherein each axial body is a cylindrical pin slidably held through a gear case of the rotary tool.

11. A clutch mechanism as defined in claim 2, wherein each axial body and each cam protrusion have an apparent cam angle and are adapted to maintain the apparent cam angle regardless of the operating condition of the rotary tool.

12. A clutch mechanism as defined in claim 2, wherein each axial body is a cylindrical pin slidably held through a gear case of the rotary tool.

13. A clutch mechanism for use in a rotary tool having screw-driving and drill modes, the clutch mechanism comprising:

an epicyclic reduction gear mechanism including an internal gear rotatably held within a housing;

a plurality of axial cam protrusions provided on an axial end surface of the internal gear, each cam protrusion having at least one guide slope surface;

a plurality of axially movable press members;

biasing means for pressing the press members against the axial end surface of the internal gear so as to secure the cam protrusions to prevent rotation of the gear by causing the press members to interfere with the guide slope surfaces of the cam protrusions; and means for selectively regulating the axial movement of the press members away from the axial end surface, wherein each press member comprises an axial body which is disposed orthogonally to the axial end surface of the internal gear and which includes at least one slope surface, the slope surface being slidable on the guide slope surfaces due to revolution of the cam protrusions so as to move the axial body away from the axial end surface of the internal gear.

* * * * *

UNITED STATES PATENT AND TRADEMARK OFFICE
CERTIFICATE OF CORRECTION

PATENT NO.    : 6,523,658 B2
DATED         : February 25, 2003
INVENTOR(S)   : Furuta et al.

It is certified that error appears in the above-identified patent and that said Letters Patent is hereby corrected as shown below:

Column 1,
Line 52, replace "to the too in this" with -- to the tool in this --;

Column 2,
Line 25, replace "the axial end, surface" with -- the axial end surface --;
Line 50, replace "enhancing the performance the clutch" with -- enhancing the performance of the clutch --;

Column 6,
Line 6, replace "subjected to sever impact" with -- subjected to severe impact --;

Column 7,
Line 33, replace "in claim I further" with -- in claim 1 further --.

Signed and Sealed this

Second Day of September, 2003

JAMES E. ROGAN
*Director of the United States Patent and Trademark Office*